(12) United States Patent
Hodges et al.

(10) Patent No.: US 9,285,851 B2
(45) Date of Patent: Mar. 15, 2016

(54) OPTIMIZING BATTERY USE FOR KNOWN FUTURE LOAD

(75) Inventors: Stephen Hodges, Cambridge (GB); Ranveer Chandra, Kirkland, WA (US); Julia Louise Meinershagen, Seattle, WA (US); James Scott, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 566 days.

(21) Appl. No.: 13/530,130

(22) Filed: Jun. 22, 2012

(65) Prior Publication Data

US 2013/0346762 A1 Dec. 26, 2013

(51) Int. Cl.
| | |
|---|---|
| G06F 1/00 | (2006.01) |
| G06F 1/26 | (2006.01) |
| H01M 10/42 | (2006.01) |
| H01M 10/44 | (2006.01) |
| H01M 10/48 | (2006.01) |
| G06F 1/32 | (2006.01) |
| H02J 7/00 | (2006.01) |

(52) U.S. Cl.
CPC ............... *G06F 1/263* (2013.01); *G06F 1/3206* (2013.01); *G06F 1/3234* (2013.01); *H01M 10/4257* (2013.01); *H01M 10/441* (2013.01); *H01M 10/482* (2013.01); *G06F 1/3212* (2013.01); *H01M 2010/4278* (2013.01); *H02J 7/007* (2013.01); *H02J 7/0068* (2013.01); *H02J 7/0091* (2013.01)

(58) Field of Classification Search
CPC ... H01M 2220/30; H02J 7/007; H02J 7/0068; H02J 7/00; H02J 7/0091; B60W 10/26; G06F 1/3212

USPC .......................................................... 713/300
See application file for complete search history.

(56) References Cited

U.S. PATENT DOCUMENTS 5,519,261 A * 5/1996 Stewart ........................... 307/87
5,614,332 A 3/1997 Pavelle et al.
(Continued)

OTHER PUBLICATIONS

Styler, et al., "Active Management of a Heterogeneous Energy Store for Electric Vehicles", In IEEE Forum on Integrated and Sustainable Transportation System, Jun. 29-Jul. 1, 2011, pp. 20-25.
(Continued)

*Primary Examiner* — Jaweed A Abbaszadeh
*Assistant Examiner* — Xuxing Chen
(74) *Attorney, Agent, or Firm* — Jim Ross; Sonia Cooper; Micky Minhas

(57) ABSTRACT

Methods for optimizing battery use for a known future load are described. In an embodiment, one or more battery cells are selected from a set of battery cells to provide power to a computing-based device. The battery cells are selected based on discharge profile data for each battery cell and both the current power requirement and a known future power requirement of the computing-based device. The known future power requirement is calculated based on information available to the operating system running on the computing-based device. In some examples, one or more battery cells may also be selected for charging when a power source is available and these cells may be selected based on charge profile data and the known future power requirement. The selection of the battery cells may also be made in order to satisfy a battery optimization goal, which may be defined by a user.

20 Claims, 5 Drawing Sheets

(56) References Cited

U.S. PATENT DOCUMENTS

| | | |
|---|---|---|
| 6,346,794 B1 | 2/2002 | Odaohhara |
| 6,353,304 B1 | 3/2002 | Atcitty et al. |
| RE38,918 E | 12/2005 | Svensson et al. |
| 2005/0258686 A1* | 11/2005 | Hiramitsu et al. ........... 307/10.1 |
| 2008/0263375 A1* | 10/2008 | Sundstrom et al. ........... 713/320 |
| 2009/0018785 A1* | 1/2009 | Huseth et al. .................. 702/63 |
| 2010/0164430 A1* | 7/2010 | Lu et al. ........................ 320/103 |
| 2010/0201320 A1* | 8/2010 | Coe et al. ...................... 320/129 |
| 2010/0235007 A1* | 9/2010 | Constien et al. ............. 700/291 |
| 2011/0016333 A1 | 1/2011 | Scott et al. |
| 2011/0018679 A1* | 1/2011 | Davis et al. .................... 340/3.1 |
| 2011/0025258 A1* | 2/2011 | Kim et al. ...................... 320/106 |
| 2011/0057617 A1 | 3/2011 | Finberg et al. |
| 2012/0119705 A1* | 5/2012 | Eberhard et al. ............. 320/118 |

OTHER PUBLICATIONS

Ravi, et al., "Context-aware Battery Management for Mobile Phones", In Proceedings of the Sixth Annual IEEE International Conference on Pervasive Computing and Communications (PerCom 2008), Mar. 2008.

\* cited by examiner

OPTIMIZING BATTERY USE FOR KNOWN FUTURE LOAD

BACKGROUND

Consumer electronic devices, such as portable computing devices (e.g. smart phones, laptops, tablets, etc) typically use lithium-ion or lithium-polymer batteries. With the ever increasing functionality of such devices, the demands on battery technology are increasing rapidly. Battery performance is increasing year-on-year, but these improvements are linear compared to the exponential Moore's Law growth in the performance of the electronic systems they power. To address these requirements, new battery chemistries are being developed; however, whilst a particular new battery chemistry may offer benefits in one area (e.g. speed of charging), there is typically a trade-off against another characteristic (e.g. storage capacity).

The embodiments described below are not limited to implementations which solve any or all of the disadvantages of known methods of managing battery use.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Methods for optimizing battery use for a known future load are described. In an embodiment, one or more battery cells are selected from a set of battery cells to provide power to a computing-based device. The battery cells are selected based on discharge profile data for each battery cell and both the current power requirement and a known future power requirement of the computing-based device. The known future power requirement is calculated based on information available to the operating system running on the computing-based device. In some examples, one or more battery cells may also be selected for charging when a power source is available and these cells may be selected based on charge profile data and the known future power requirement. The selection of the battery cells may also be made in order to satisfy a battery optimization goal, which may be defined by a user.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
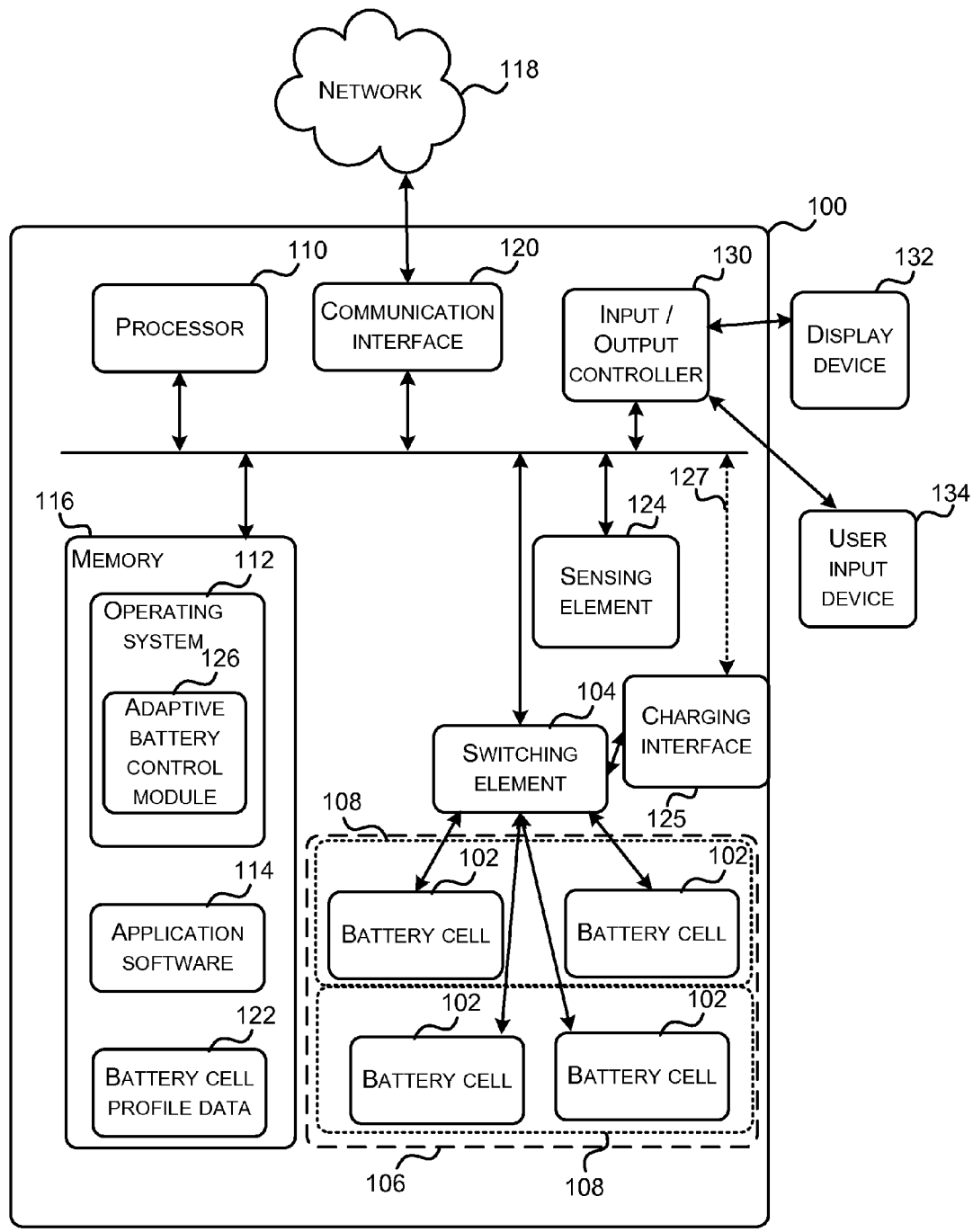
FIG. 1 is a schematic diagram of an example computing-based device.

FIG. 1 is a schematic diagram of an example computing-based device 100, such as an electronic consumer device (e.g. a mobile phone, laptop computer, tablet computer or other portable computing device), which comprises multiple battery cells 102 and which is arranged to adaptively control which of the multiple battery cells 102 are charged or discharged (e.g. being used to provide power to the device) at any time based on one or more different factors and/or to achieve a predefined goal (which may be referred to as a 'battery optimization goal'). Examples of these factors include, but are not limited to: the current load on the battery cells and a known future load on the battery cells. A switching element (or switching network) 104 may be used to switch between battery cells 102.

The battery cells 102 may all be part of a single battery (e.g. as indicated by dotted line 106 in FIG. 1) or the computing-based device 100 may comprise multiple batteries (as indicated by dotted lines 108 in FIG. 1) with each battery comprising one or more battery cells 102. Where any battery within the computing-based device 100 comprises a plurality of cells 102, the battery may be described as having multiple modes of operation, with each mode corresponding to a different combination of cells 102 being connected to provide power to the computing-based device 100.

In various examples, the battery cells 102 which are adaptively controlled may all be of the same type, i.e. each battery cell may use the same battery technology (i.e. homogeneous battery technology) and any suitable battery technology may be used. Examples of battery technologies include, but are not limited to: lithium-ion, lithium-polymer and lithium iron phosphate (LiFePO$_4$) chemistries, supercapacitors (also known as ultracapacitors) and fuel cells. In other examples, the plurality of battery cells 102 within the computing-based device 100 may comprise battery cells of different types and in some examples, these battery cells may operate internally at different voltages. For example, the computing-based device 100 (which may, for example, be a mobile phone) may comprise a lithium ion battery and a supercapacitor. In another example, the computing-based device 100 may comprise a fuel cell and a lithium-polymer cell. In further examples, the computing-based device 100 may comprise more than two different types of battery cells. Where the battery cells within the computing-based device comprise more than one battery technology, the cells may be described as using heterogeneous battery technology.

The computing-based device 100 also comprises one or more processors 110 which may be microprocessors, controllers or any other suitable type of processors for processing computer executable instructions to control the operation of the device. In some implementations, for example where a system on a chip architecture is used, the processors 110 may include one or more fixed function blocks (also referred to as accelerators) which implement a part of the method of operation in hardware (rather than software or firmware). Platform software comprising an operating system 112 or any other suitable platform software may be provided at the computing-based device 100 to enable application software 114 to be executed on the device.

The computer executable instructions may be provided using any computer-readable media that is accessible by computing-based device 100. Computer-readable media may include, for example, computer storage media such as memory 116 and communications media. Computer storage media, such as memory 116, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 116) is shown within the computing-based device 100 it will be appreciated that the storage may be distributed or located remotely and accessed via a network 118 or other communication link (e.g. using communication interface 120). The communication interface 120 may use any appropriate technology and protocol and this may include wired and/or wireless technologies.

The memory 116 may also provide a data store and may, for example, be used to store battery cell profile data 122. This battery cell profile data 122 comprises charging and/or discharging profiles for each battery cell 102 and these profiles may be derived, learned or uploaded to the device, as described in more detail below. Alternatively, this battery cell profile data 122 may comprise a model which can be used to generate charging and/or discharging profiles. Although the battery cell profile data 122 is shown in FIG. 1 has being stored in memory 116 within computing-based device 100, in other examples, the data may be stored in a separate data store (separate from memory 116). Other elements shown in FIG. 1 are described below.

Figure 2:
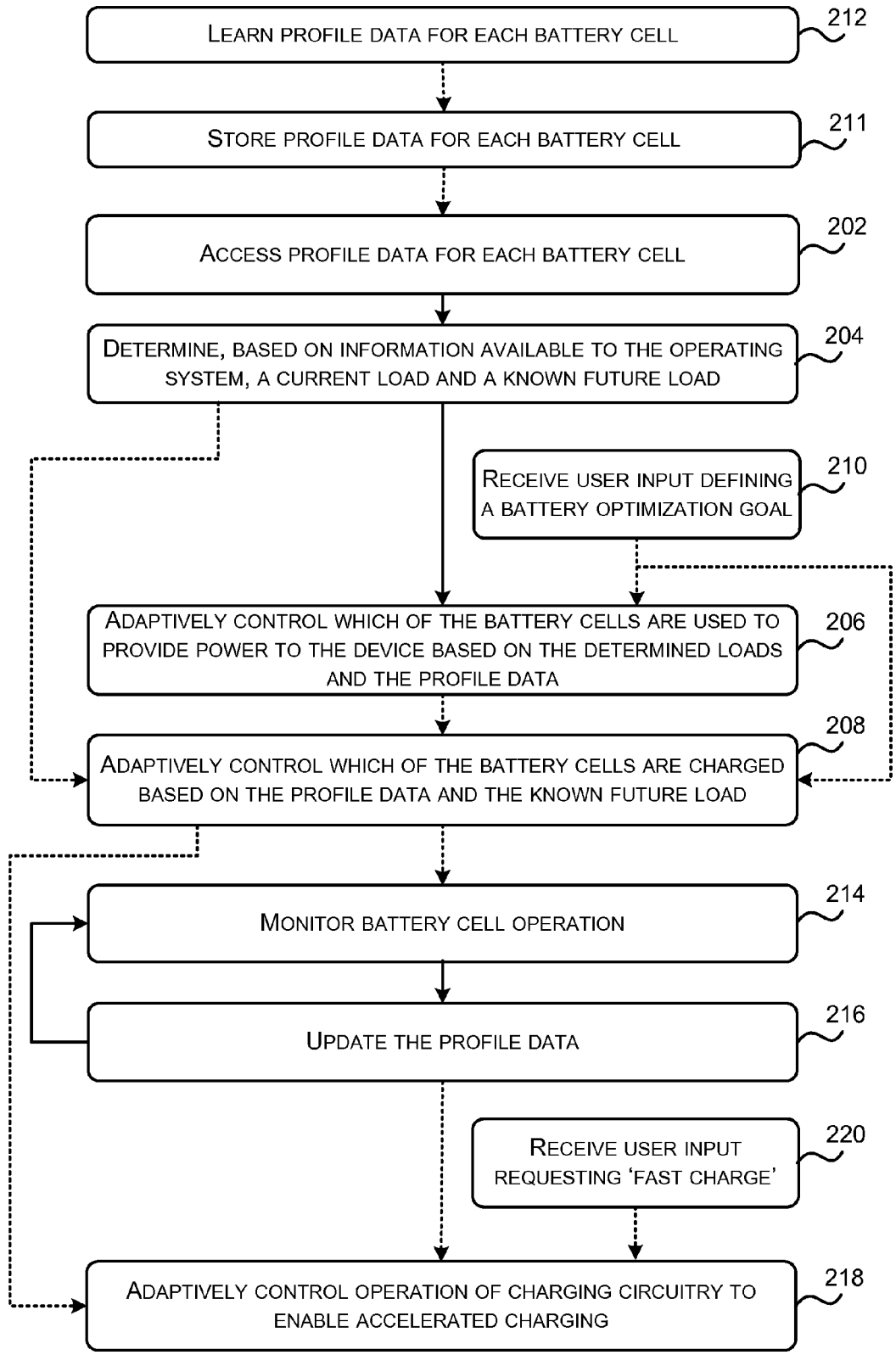
FIG. 2 shows a flow diagram of an example method of operation of a computing-based device, such as those shown in FIGS. 1 and 3-5.

FIG. 2 shows a flow diagram of an example method of operation of a computing-based device, such as computing-based device 100 as shown in FIG. 1. The method comprises accessing profile data for each battery cell (block 202, e.g. battery cell profile data 122), where, as described above, this profile data comprises charging and/or discharging profiles for each battery cell 102 or a model from which charging and/or discharging profiles may be generated. The method further comprises determining both a current power requirement (or load) and a known future power requirement (or load) based on information available to the operating system (block 204), and then using both the profile data and the calculated loads (i.e. the current load and the known future load) to adaptively control which of the plurality of battery cells 102 are used to provide power to the computing-based device 100 (block 206). As described in more detail below, there may be other parameters or factors which are considered when adaptively controlling which of the plurality of battery cells 102 are discharged (e.g. user preferences or an objective function or goal).

In some examples, the method may further comprise adaptively controlling which of the battery cells are charged (block 208) and this adaptive control of charging may be based on at least the battery cell profile data 122 and the known future load (as determined in block 204). In yet further examples, the method may comprise adaptively controlling charging (in block 208) instead of adaptively controlling which battery cells are used to power the device (i.e. block 206 is omitted). As shown in FIG. 1, the computing based device 100 may further comprise a charging interface 125 and this interface may comprise a power input connection and any associated charging circuitry. The switching element 104 may be used to selectively connect any of the battery cells 102 to the charging interface 125.

By adaptively controlling which battery cells are discharged and/or charged, as described above, the operation of the battery cells can be optimized. The action of discharging a battery cell is used herein to refer to reducing the charge in a battery cell by powering the device (or another device) or by providing power to charge another battery cell, where this battery cell may be located within the device (or within another device). This optimization of the operation of the battery cells may be defined in terms of one or more different goals and various examples are described below. These goals may be referred to as 'battery optimization goals'.

In a first example, the set of battery cells 102 may be adaptively controlled to improve the collective efficiency of the set of battery cells 102. This may, for example, comprise increasing (e.g. to maximizing) the electrical energy that can be delivered by the set of cells by reducing (e.g. by minimizing) the energy which is lost in the form of heat or chemical change within the cells. This may involve adaptively controlling which cells are charged/discharged in order to keep the charging/discharging rates as close to the cell's optimum operating conditions. For example, a computing-based device which comprises a lithium-ion cell and a supercapacitor may draw power from the supercapacitor during periods of increased load (e.g. during spikes in the load profile) in order to smooth the power drawn from the lithium-ion cell and such that the power drawn from the lithium-ion cell is closer to the optimum discharge curve (or rate). In another example, the set of battery cells 102 may be adaptively controlled to provide power at a required voltage level in the most efficient way and taking into consideration that different battery cells may operate at different voltages internally. By selecting the appropriate combination of battery cells 102, inefficient voltage conversion stages may be reduced or eliminated.

In a second example, the set of battery cells 102 may be adaptively controlled to increase (e.g. to maximize or otherwise optimize) the long-term collective life of the battery cells. This may be particularly relevant where the battery cells are part of a single battery and/or where the battery cells are not replaceable and therefore by increasing the long-term life of the battery cells, the operating life of the computing-based device itself is increased.

In a third example, the set of battery cells 102 may be adaptively controlled to reduce (e.g. to minimize) the cost of replacement of the battery cells, where 'cost' may be defined in terms of money, environmental cost (e.g. based on the ability to recycle or use of hazardous materials or pollutants), ease of replacement (e.g. ease of access or time taken to replace) etc. This may, for example, involve adaptively controlling the charging/discharging of the battery cells such that battery cells which are less expensive to replace are sacrificed in some way (e.g. through non-optimum charging/discharging) so that more expensive battery cells can be operated closer to their optimum conditions. In an example, cells 102 which can be recycled (and hence have lower environmental cost) may be operated away from their optimum operating conditions in order that cells which cannot be recycled can be charged/discharged in a manner which is closer to their optimum operating conditions and so maximize the operational life of the non-recyclable cells.

In a fourth example, the set of battery cells 102 may be adaptively controlled to increase (e.g. to maximize) the use of upcoming recharging opportunities, thus increasing the utility of such recharging opportunities. Where heterogeneous battery cells are used, this adaptive control uses both the availability and type of recharging opportunities because different battery types may be recharged in very different ways and at different locations. For example, a computing-based device comprising a fuel cell and a lithium-polymer cell may discharge the fuel cell as a higher priority when it expects to be near a re-fill opportunity (which recharges the fuel cell) but switch to the lithium-polymer cell when nearer a recharging point (for the lithium-polymer cell). There are many ways that a computing-based device may determine that there is an upcoming recharging opportunity and examples include: prediction based on previous history (e.g. the device is connected to a charger on most days between 10 pm and 7 am), prediction based on a combination of location information and history (e.g. the device is usually connected to a charger when in a particular location) and sensing the presence of a charging device (e.g. using RFID tags, Bluetooth®, etc).

In a fifth example, the computing-based device 100 may detect the presence of an alternative power source and then use this knowledge in adaptively controlling the battery cells 102 (e.g. in blocks 206 and/or 208). Examples of alternative power sources may comprise a spare battery (e.g. which is not currently connected to the computing-based device 100) or power which may be available to be scavenged from the environment. Examples of power that may be scavenged from the environment include, but are not limited to, generating electricity from solar power, generating electricity from heat (e.g. using a Peltier device), and generating electricity from vibrations. These alternative power sources may be used to provide power directly to the computing-based device 100 instead of using the battery cells 102.

The detection of the alternative power source may be performed using a sensing element 124 within the computing-based device 100 (e.g. as shown in FIG. 1). This sensing element may, for example, comprise an RFID reader or wireless receiver (e.g. a Bluetooth® module). Such an element may be used to detect alternative power sources (such as spare batteries) which are tagged with an RFID tag or which comprise a wireless module arranged to transmit a beacon signal. In examples where power is scavenged from the environment, the sensing element 124 may also be the element which generates power from the environment, e.g. an array of solar cells or a Peltier device. In various examples, there may also be a software component (e.g. stored in memory 116) which is used in performing the detection of the alternative power source or this functionality may be integrated within the software that performs the adaptive control of the battery cells (e.g. within the adaptive battery control module 126).

It will be appreciated that the alternative power source may be used for discharging and/or charging one or more of the battery cells (e.g. a subset of the battery cells as determined in block 208 of FIG. 2) in addition to (or instead of) being used to power the device directly and in such an instance the availability of a such a power source may be considered a recharging opportunity, as discussed above.

In a sixth example, the set of battery cells 102 may be adaptively controlled to increase the flexibility in providing power to the computing-based device 100. In a specific example, a laptop may comprise 9 cells arranged in 3 groups of 3 cells. When operating in high-current mode, all the cells may be selected (in block 206) to provide power to the laptop, but when operating in a lower power mode, only 3 or 6 cells may be used. The adaptive control mechanism may switch between groups of cells such that all cells maintain a similar voltage level in case all 9 need to be used in parallel again. Deepening the discharge of one set of 3 cells in this manner may also reduce capacity degradation over time.

In further examples, any combination of any of these six goals described above may be used (e.g. by keeping the charging/discharging rates as close to optimum as possible whilst also maximizing the utility of any recharging opportunities) or other goals may be used (e.g. maximizing performance at the expense of battery life or maximizing operating time on a single charge). In various examples, a user of the computing-based device 100 may provide user input specifying a battery optimization goal to be used when adaptively controlling which cells are charged/discharged. For example, as shown in FIG. 2, the computing-based device 100 may receive a user input defining a battery optimization goal (block 210) and then this goal may be used when adaptively controlling which battery cells are discharged (in block 206) or charged (in block 208).

The user-defined battery optimization goal may be one of the six example goals described above or a different goal. For example, the user-defined battery optimization goal (received in block 210) may specify a required device lifetime (e.g. two years, which may correspond to the contract length for a mobile telephone) and then the adaptive control mechanism may control the charge / discharge of the plurality of battery cells 102 to optimize their collective operation over the user-defined lifetime (e.g. over a two year period). In some examples, the computing-based device 100 may provide a user interface to enable a user to select one or more goals (e.g. from a list of the goals described above) or otherwise specify the user-defined battery optimization goal.

The method shown in FIG. 2 comprises the step of determining a known future power requirement (or load) based on information available to the operating system (in block 204). This known future power requirement is not a prediction of future load based on the existing load or user history, but instead is based on knowledge held by the operating system 112 of the future activity that will be performed by the computing-based device 100. For example, the known future power requirement at a time in the future, $t_0+\Delta t$, (where the current time is $t_0$ and the interval between the current time and the time of the known future load is $\Delta t$) may be based on knowledge that various processes will be running on the computing-based device 100 and as a result the power requirement of the computing-based device 100 at that time can be calculated. For example, the operating system 112 may be arranged to check for software updates periodically (e.g. at a set time each week) and so the operating system 112 will know that at a particular time, the computing-based device 100 will be powered up, with the communication interface 120 active, and will be downloading data. As a result, the known future load may be quite high and the value of Δt (i.e. the time interval until the known future load will be required) may be in the order of hours.

In various examples, the known future load may be an immediate future load or a short-term future load, e.g. where Δt is a few seconds or a few minutes. For example, where a data transfer is occurring between the computing-based device 100 and another device (e.g. via communication interface 120), the operating system 112 will know how long the transfer is going to take (e.g. a few seconds or a few minutes) and so will know the future load over this time period. Similarly where big disk read/writes are occurring (e.g. big file transactions or a hibernating operation), the operating system 112 will know how long the operation is going to take and hence can calculate the future load over this time period. In a further example, the operating system 112 may know of future sensor activity, such as a GPS receiver detecting the location of the device. In some instances, the operating system 112 may periodically update its known location so that applications can use this information and in such an example, the value of Δt (i.e. the time interval until the known future load will be required) may be in the order of tens of minutes (e.g. 20 minutes).

This knowledge held by the operating system 112 and which is used in determining a known future load (in block 202) may, for example, be obtained using context sensing. The determination of a particular load may also use the results of profiling which may be performed by the operating system. The operating system 112 may profile different applications, processes and/or services to obtain an estimate of the power requirement for a particular application/process/service and then based on knowledge of applications/processes/services that will be running at a particular time in the future, the load at that time can be determined (in block 202).

The method shown in FIG. 2 includes the step of accessing profile data for each battery cell (block 202, e.g. battery cell profile data 122), where this profile data comprises charging and/or discharging profiles for each battery cell 102 and may, in some examples, comprise a model of the charging/discharging properties of a battery cell. The profile data may, for example, comprise one or more of:
- the change in capacity;
- the time taken to charge/discharge from a particular starting charge level to various end charge levels;
- the maximum voltage achieved;
- any change in performance or other reaction to a temperature environment that the device might normally encounter; and
- the efficiency of charging/discharging at various currents.

The method may further comprising storing the profile data for each battery cell (block 211) and in which case, the profile data may be accessed from the local storage location. Alternatively, the profile data may be accessed from another location (e.g. a remote device). The profile data which is stored for each battery cell (in block 211) may be provided by the manufacturer of the battery cell (e.g. based on factory characterization of the battery cell) or by a third party (e.g. using standard characteristics provided for a particular type of battery cell). In other examples, however, the profile data may be learned by the computing-based device (block 212).

Irrespective of whether the initial profile data which is stored (in block 211) is provided by a third party and uploaded to the computing-based device or learned by the computing-based device (in block 212), the computing-based device 100 may monitor battery cell operation (block 214) and update the stored profile data based on the output of the monitoring step (block 216).

There are many ways in which the adaptive control of the plurality of battery cells, as described above, may be implemented. In the example shown in FIG. 1, the adaptive control is performed by the operating system 112 itself and in such an example, the operating system 112 may include an adaptive battery control module 126. This module 126 comprises computer-executable instructions which, when executed, cause the processor to determine the current load and the known future load (in block 204) and to adaptively control which of the battery cells are charged (in block 206) and/or discharged (in block 208). The adaptive battery control module 126 sends commands to the switching element 104 (or otherwise controls the switching element) to connect/disconnect individual battery cells, or groups of battery cells, to the device 100 and/or to the charging interface 125. This module 126 may also comprise computer-executable instructions which, when executed, cause the processor to perform one or more of the following optional steps: store profile data for each battery cell (in block 211), learning profile data for each battery cell (in block 212), monitoring battery cell operation (in block 214) and updating the stored profile for a battery cell (in block 216).

In some examples the adaptive battery control module 126 or another component within the device 100 (e.g. another software module) may also adaptively control the charging operation (block 218 in FIG. 2), i.e. may control the operation of the charging interface 125 (e.g. via link 127), to provide accelerated or 'fast' charging by overdriving the charging interface 125. Any suitable mechanism may be used to implement this overdriving such that the charging interface 125 is able to charge a battery cell 102 more quickly than in its standard operating mode and in an example, the current output by the charging interface 125 to a battery cell 102 may be increased above the standard level. This fast charging may only be operable for a short period of time and may, for example, be used in order to optimize a short charging opportunity or to quickly boost the charge level of a battery cell 102 before the end of the charging opportunity. The overdriving may be controlled according to the stored charging profiles for the battery cells in order that the battery cells are not damaged by the process. In some examples, the overdriving may be implemented automatically (e.g. by the adaptive battery control module 126) and in other examples it may be implemented at the request of a user (e.g. in response to a user input received in block 220 of FIG. 2).

The computing-based device 100, shown in FIG. 1, also comprises an input/output controller 130 arranged to output display information to a display device 132 which may be separate from or integral to the computing-based device 100. The display information may provide a graphical user interface. This graphical user interface may be arranged to enable a user to define a battery optimization goal (e.g. by selecting one or more goals from a list of possible goals). In some examples, this graphical user interface may be arranged to display information generated by the adaptive battery control module 126 such as information showing how well a battery optimization goal is being met or advice/warning messages for the user. For example, a warning message may alert the user of battery cells approaching the end of their operating life and an advice message may inform the user about a type of battery cells to use when replacing battery cells to more closely meet a defined goal (e.g. based on past user data).

The input/output controller 130 is also arranged to receive and process input from one or more devices, such as a user input device 134 (e.g. a mouse, keyboard, camera, microphone or other sensor). In some examples the user input device 134 may detect voice input, user gestures or other user actions and may provide a natural user interface (NUI). This user input may be used to receive a user input which defines a battery optimization goal (e.g. as received in block 210). In an embodiment the display device 132 may also act as the user input device 134 if it is a touch sensitive display device. The input/output controller 130 may also output data to devices other than the display device, e.g. a locally connected printing device (not shown in FIG. 1).

Any of the input/output controller 130, display device 132 and the user input device 134 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

Figure 3:
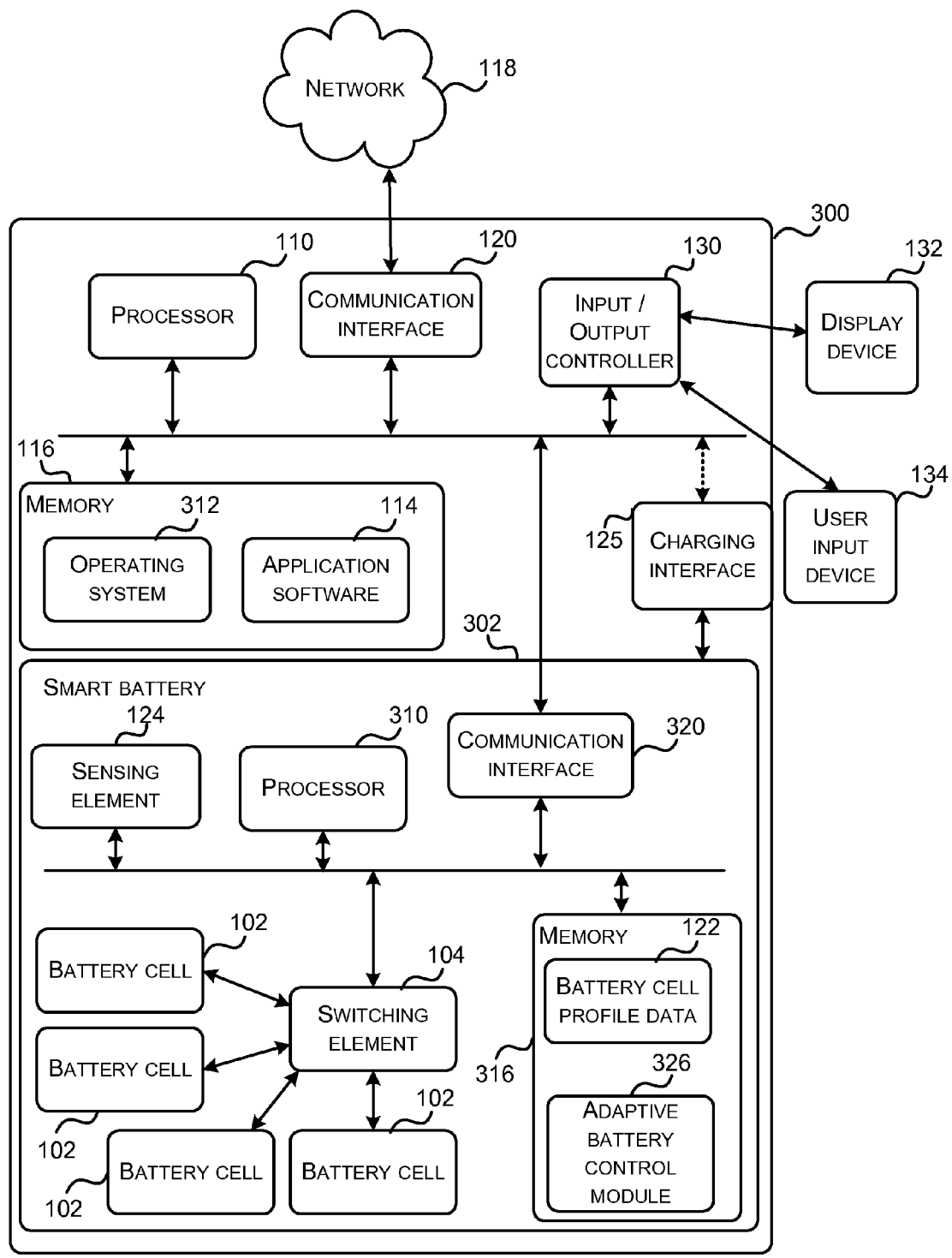
FIG. 3 is a schematic diagram of an example computing-based device which comprises a smart battery module.

FIG. 3 is a schematic diagram of another example computing-based device 300 which comprises multiple battery cells 102 and which is arranged to adaptively control which of the multiple battery cells 102 are charged or discharged at any time based on one or more different factors and/or to achieve a predefined goal. This computing-based device 300 has many features which are the same as those in computing-based device 100 shown in FIG. 1 (as described above) and for reasons of clarity, the description of many of these common features is not repeated here. This computing-based device 300 may also operate as shown in the example flow diagram in FIG. 2; however, different elements within the computing-based device 300 may implement particular method steps when compared with the computing-based device 100 shown in FIG. 1.

The computing-based device 300 shown in FIG. 3 comprises a 'smart battery' 302 which comprises multiple battery cells 102 (as described above) and performs the adaptive control of the charging and/or discharging of these cells. The smart battery 302 also comprises a processor 310, memory 316, switching element 104 (as described above) and a communication interface 320. The communication interface 320 may use any suitable technology to interact with the rest of the system and examples of suitable interfaces include, but are not limited to, serial, I²C, SPI. In an example, the communication interface 320 may comprise a WiFi (or other wireless technology) module which is arranged to communicate with the rest of the system via communication interface 120. The smart battery may also comprise a sensing element 124 (as described above).

The processor 310 may be a microprocessor, controller or any other suitable type of processor for processing computer executable instructions to control the operation of the smart battery and may include one or more fixed function blocks, as described above. As described above with reference to memory 116 in computing-based device 100, the memory 316 (or other form of computer storage media) in the smart battery 302 includes volatile and non-volatile, removable and non-removable media implemented in any method or technology for storage of information such as computer readable instructions, data structures, program modules or other data.

This memory 316 is used to store the adaptive battery control module 326. This module 326 is similar to the adaptive battery control module 126 in FIG. 1, but is not part of the computing-based device's operating system 312. In such an embodiment, the operating system 312 exposes an API (application programming interface) which the smart battery 302 uses to query the operating system 312 for information (via communication interface 320). Information which may be provided to the smart battery 302 by the operating system 312 via the API comprises information to enable the adaptive battery control module 326 to determine a known future load (in block 204 of FIG. 2) and information relating to user input (e.g. where a user input defining a battery optimization goal is received by the computing-based device 300, as in block 210). As described above with reference to module 126, the adaptive battery control module 326 comprises computer-executable instructions which, when executed, cause the processor 310 to determine the current load and the known future load (in block 204) based on information available via the API and to adaptively control which of the battery cells 102 are charged (in block 206) and/or discharged (in block 208). This module 326 may also comprise computer-executable instructions which, when executed, cause the processor 310 to perform one or more of the following optional steps: store profile data for each battery cell (in block 211), learning profile data for each battery cell (in block 212), monitoring battery cell operation (in block 214) and updating the stored profile for a battery cell (in block 216) and adaptive control of charging operations (in block 218). Where the battery cell profile data 122 is stored, this also be stored in memory 316 (as described above).

Through use of a smart battery 302, as described above and shown in FIG. 3, the adaptive control of battery cells may be transparent to the operating system 312 and/or application software 114 running on the device 300.

Figure 4:
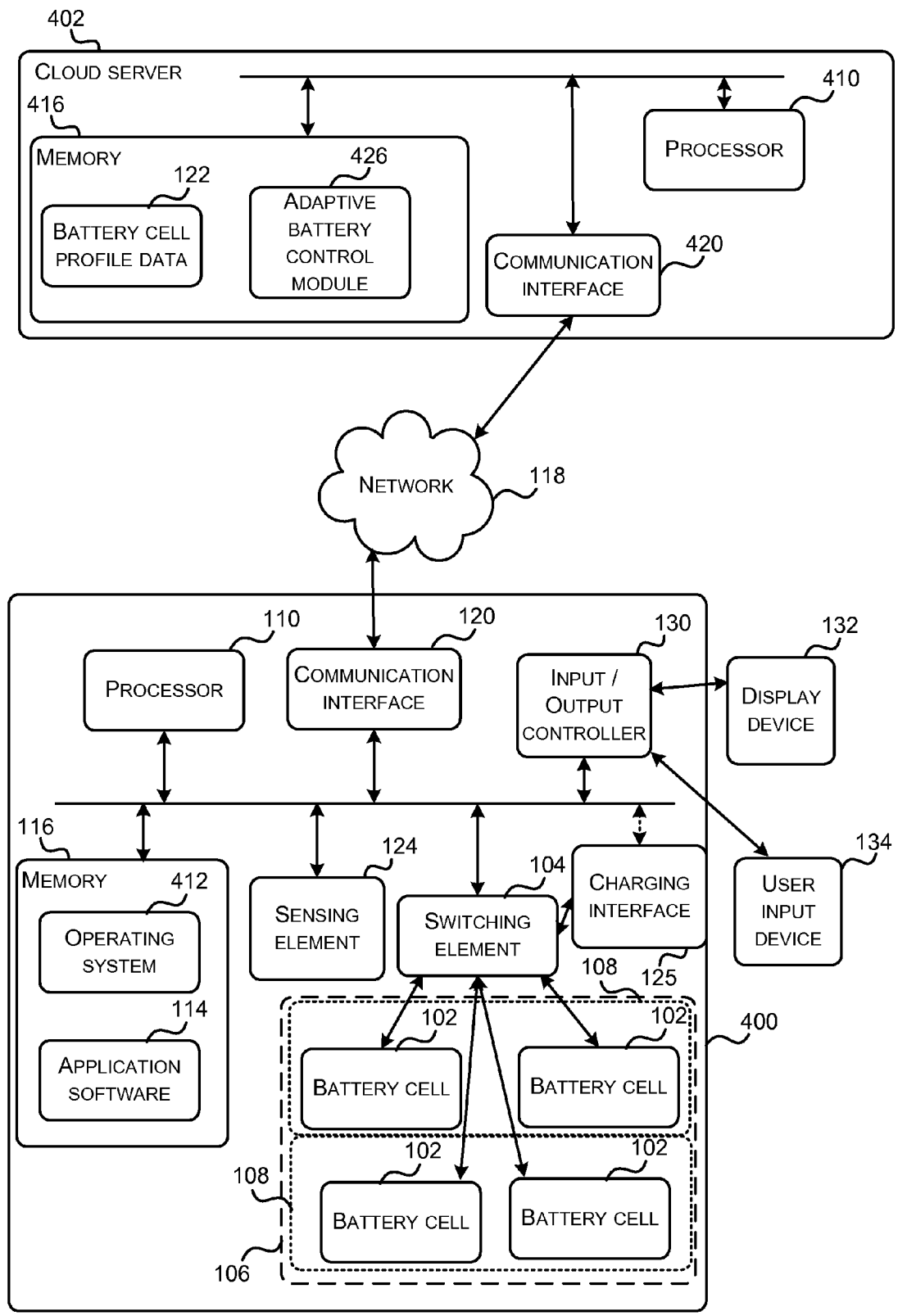
FIG. 4 is a schematic diagram of an example computing-based device which comprises a plurality of battery cells which are controlled remotely.

FIG. 4 is a schematic diagram of a further example computing-based device 400 which comprises multiple battery cells 102. In this example, the adaptive control of which of the multiple battery cells 102 are charged or discharged at any time is performed by a remote device 402, which may be a cloud based server and which is in communicating with the computing-based device 400 via a communication interface 420 and network 118. Both the computing-based device 400 and remote device 402 have many features which are the same as those in computing-based device 100 shown in FIG. 1 (as described above) and for reasons of clarity, the description of many of these common features is not repeated here. The remote device 402 may operate as shown in the example flow diagram in FIG. 2; however, it will be appreciated that the remote device 402 is controlling battery cells located in another computing-based device 400 to power that computing-based device 400, rather than controlling its own power supply.

Most of the features of computing-based device 400 are the same as shown in FIG. 1 and described above; however the operating system 412 does not comprise an adaptive battery control module as this functionality is implemented at the remote device 402. Similarly, the battery cell profile data 122 may be stored in the memory 416 of the remote device instead of in the memory 116 of the computing-based device 400. As described above with respect to FIG. 3, the operating system 412 provides information to the remote device 402 to enable it to perform the adaptive control of the battery cells and this information may be provided via an API (as described above)

or by any other method (e.g. information to enable load calculations and in some examples information about a user input).

The remote device 402 comprises one or more processors 410, wherein a processor may be a microprocessor, controller or any other suitable type of processor for processing computer executable instructions to perform adaptive battery control and may include one or more fixed function blocks, as described above. The remote device 402 also comprises computer storage media, such as memory 416. As described above with reference to memory 116 in computing-based device 100, the memory 416 (or other form of computer storage media) includes volatile and non-volatile, removable and non-removable media implemented in any method or technology for storage of information such as computer readable instructions, data structures, program modules or other data.

The memory 416 is used to store the adaptive battery control module 426. This module 426 provides much of the same functionality as the adaptive battery control module 126 in FIG. 1 and adaptive battery control module 326 in FIG. 3. As described above, with reference to modules 126 and 326, the adaptive battery control module 426 comprises computer-executable instructions which, when executed, cause the processor 410 to determine the current load and the known future load (in block 204); however, in this implementation, these loads relate to the computing-based device 400 (and not remote device 402) and are based on information available to the computing-based device's operating system 412. As described above, this information may be made available to the remote device 402 via an API or using other means.

The adaptive battery control module 426 further comprises computer-executable instructions which, when executed, cause the processor 410 to adaptively control which of the battery cells 102 in the computing-based device 402 are charged (in block 206) and/or discharged (in block 208). This module 426 may also comprise computer-executable instructions which, when executed, cause the processor 410 to perform one or more of the following optional steps: storing profile data for each battery cell in the computing-based device 400 (in block 211, e.g. in memory 416), learning profile data for each battery cell in the computing-based device 400 (in block 212), monitoring battery cell operation (in block 214) and updating the stored profile for a battery cell (in block 216), and adaptively controlling charging operations (in block 218).

Figure 5:
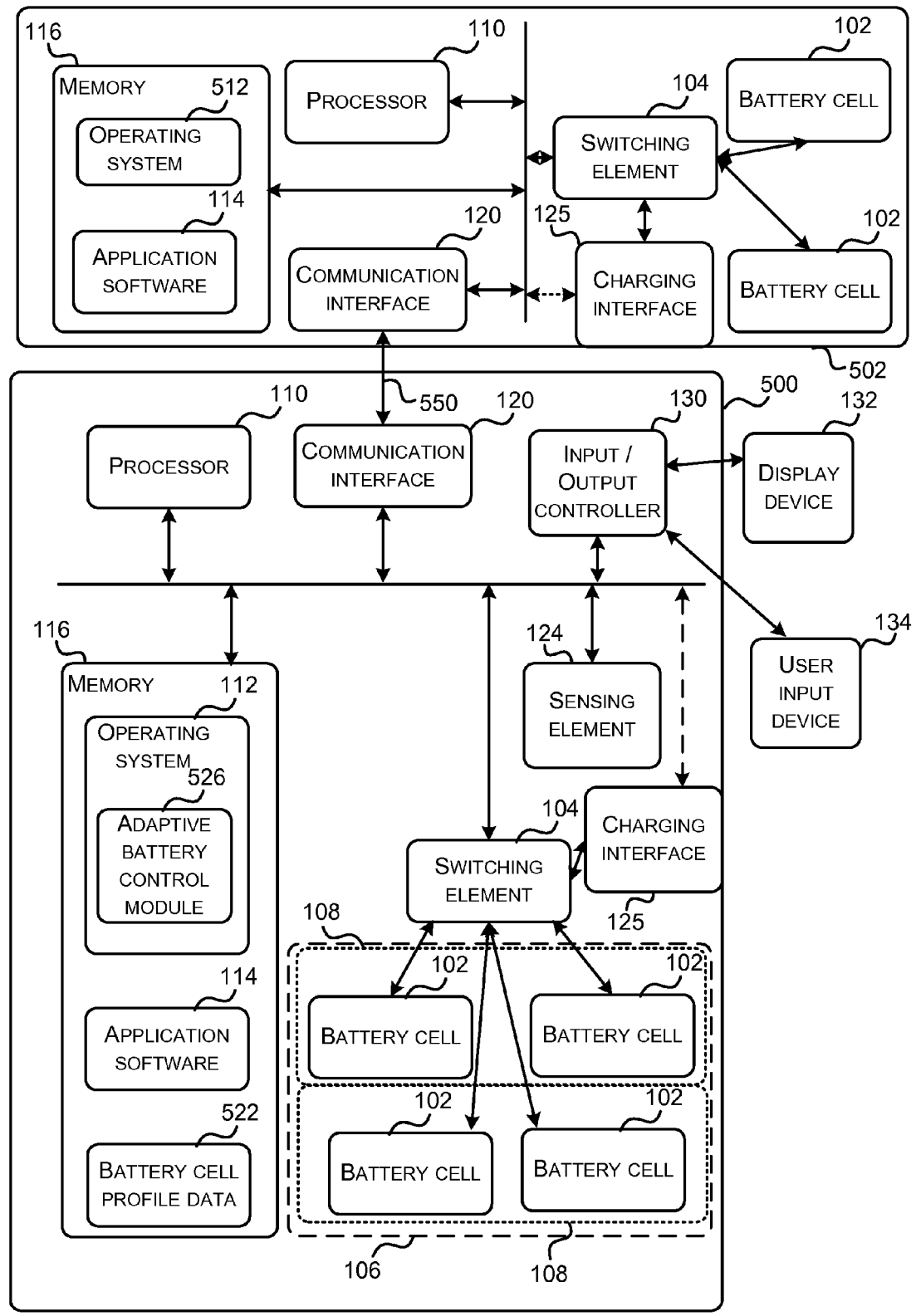
FIG. 5 is a schematic diagram of an example system comprising a plurality of computing-based devices in which the battery cells across all the devices are controlled from one device.

FIG. 5 is a schematic diagram of a system of devices in which the adaptive control methods described above may be used across multiple devices. In this example, the system comprises a master device 500 and one or more slave devices 502 (e.g. the master device 500 may be a mobile telephone and the slave device 502 may be a peripheral device such as a wireless headset). The master device 500 comprises an operating system 112 which includes an adaptive battery control module 526 which operates as described above (and shown in FIG. 2) with the difference that it adaptively controls all the battery cells 102 within the system, where these battery cells are spread across multiple devices, and can optimize the battery cells across multiple devices collectively to meet a battery optimization goal. In some examples, the link 550 between the master device 500 and any slave devices 502 may be configured to transfer both data and power such that power can be shared from master to slave or slave to master under the control of the adaptive battery control module 526. Alternatively a separate link may be provided to transfer power separately from the data.

The stored profile data 522 in memory 116 in the master device 500 relates not only to the local battery cells within the master device 500 but also to battery cells 102 in slave devices 502. The operating systems 512 in the slave devices may provide information to the master device 500 to enable the current and future known loads to be determined (in block 204 of FIG. 2) in a similar manner to described above with reference to FIGS. 3 and 4. It will be appreciated that there may be more than one slave device 502 and that only a subset of the functional elements within the slave device 502 are shown in FIG. 5 (e.g. the slave device may comprise an input/output controller). Further, in this embodiment, any one device (master/slave) may comprise one or more battery cells (of the same or different types) and the adaptive battery control module 526 is arranged to control a plurality of battery cells 102 which are distributed between the devices 500, 502 in the system.

The methods described above may be used to build batteries from multiple heterogeneous battery cells and to provide increased operating efficiency (or to satisfy another battery optimization goal). The fine-grained control of individual cells or groups of cells which is provide by the adaptive battery control module 126, 326, 426, 526 according to the charge/discharge characteristics of the cells enables the operating efficiency to be improved (e.g. maximized) and so improve (e.g. maximize) the efficiency of the battery as a whole.

Although the present examples are described and illustrated herein as being implemented in a computing-based device (as shown in FIGS. 1 and 3) or system of such devices (e.g. as shown in FIGS. 4 and 5), the system described is provided as an example and not a limitation. As those skilled in the art will appreciate, the present examples are suitable for application in a variety of different types of battery powered devices/systems.

Furthermore, although the adaptive battery control module 126, 326, 426, 526 is described above as being implemented in software running on a processor, in other examples the module may be implemented in hardware. Alternatively, or in addition, to the examples described above, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method of controlling a computing-based device, the computing-based device arranged to run an operating system and comprising a plurality of battery cells, the method comprising:
   determining whether any of the plurality of battery cells are recyclable;
   accessing a discharging profile for each of the plurality of battery cells;
   determining, based on data available to the operating system, a current load and a known future load; and
   using the discharging profile, the current load and the known future load and the determination of recyclability to adaptively control which of the plurality of battery cells are used to provide power to the computing-based device to cause a life of a non-recyclable battery cell to be longer than a life of a recyclable battery cell.

2. A method according to claim 1, further comprising:
   accessing a charging profile for each of the plurality of battery cells; and
   using the charging profile and the known future load to adaptively control which of the plurality of battery cells are charged.

3. A method according to claim 2, further comprising:
   using the charging profile to adaptively control charging of a battery cell to accelerate charging for a period of time.

4. A method according to claim 1, wherein using the discharging profile, the current load and the known future load to adaptively control which of the plurality of battery cells are used to provide power to the computing-based device comprises:
   using the discharging profile, the current load and the known future load to adaptively control which of the plurality of battery cells are used to provide power to the computing-based device in order to satisfy a battery optimization goal.

5. A method according to claim 4, further comprising:
   receiving a user input defining the battery optimization goal.

6. A method according to claim 4, wherein the battery optimization goal comprises reducing a cost of replacement of one or more of the battery cells.

7. A method according to claim 1, further comprising:
   learning the discharging profile for each of the plurality of battery cells; and
   storing the learned discharging profiles.

8. A method according to claim 1, further comprising:
   monitoring operation of a battery cell; and
   using information obtained from monitoring the battery cell to update stored profile information for the battery cell.

9. A method according to claim 1, implemented on a device remote from the computing-based device and further comprising:
   remotely accessing the data available to the operating system running on the computing-based device.

10. A computing-based device arranged to run an operating system, the device comprising:
    an adaptive battery control module;
    a plurality of battery cells;
    a graphical user interface arranged to allow a user to define a battery optimization goal, the graphical user interface being further arranged to display a warning message when at least one of the plurality of battery cells is within a specified range of the end of its operating life, the graphical user interface being further arranged to display an advice message to recommend to a user a type of battery cell to use when replacing at least one of the plurality of battery cells, the recommendation based at least in part on the battery optimization goal;

a switching element connected to each of the plurality of battery cells;

a memory arranged to store battery cell profile data for the plurality of battery cells; and a processor, wherein the adaptive battery control module is arranged to calculate a current load and a known future load based on information available from the operating system and to use the calculated loads and the stored battery cell profile data to control the switching element such that a selected subset of the battery cells are connected to provide power to the computing-based device.

11. A computing-based device according to claim 10, further comprising a sensing element arranged to detect an alternative power source.

12. A computing-based device according to claim 10, further comprising a smart battery module, the smart battery module comprising the processor, battery cells, switching element, memory and adaptive battery control module.

13. A computing-based device according to claim 10, wherein the adaptive battery control module is arranged to control the switching element such that a selected subset of the battery cells are connected to provide power to the computing-based device to satisfy a battery optimization goal.

14. A computing-based device according to claim 13, wherein the battery optimization goal is user-defined and further comprising an input/output controller arranged to receive a user input identifying the battery optimization goal.

15. A computing-based device according to claim 10, wherein the plurality of battery cells comprise at least one battery cell which uses a first battery technology and at least one battery cell which uses a second battery technology.

16. A computing-based device according to claim 15, wherein the at least one battery cell which uses a first battery technology comprises at least one supercapacitor.

17. A computing-based device according to claim 10, wherein the battery cell profile data comprises charging profiles for each battery cell or a charging model for each battery cell and the device further comprises a charging interface and wherein the adaptive battery control module is further arranged to use the calculated known future load and the stored battery cell profile data to control the switching element such that a second selected subset of the battery cells are connected to the charging interface.

18. A computing-based device according to claim 17, wherein the adaptive battery control module is further arranged to control the operation of the charging interface to provide accelerated charging to the second selected subset of the battery cells.

19. A computing-based device according to claim 10, wherein the computing-based device is a smart phone or tablet computer.

20. One or more computer storage media with device-executable instructions that, when executed by a computing system arranged to run an operating system and comprising a plurality of heterogeneous battery cells, direct the computing system to perform steps comprising:

determining whether any of the plurality of heterogeneous battery cells are recyclable;

accessing a charging profile and a discharging profile for each of the plurality of heterogeneous battery cells;

receiving a user input identifying a user-defined battery optimization goal;

displaying, at a graphical user interface, an advice message recommending to a user a type of battery cell to use when replacing at least one of the plurality of battery cells, the recommendation based at least in part on the battery optimization goal;

determining, based on data available to the operating system, a current load and a known future load;

using the discharging profile and the known future load to adaptively control which of the plurality of heterogeneous battery cells are used to provide power to the computing-based device to satisfy the user-defined battery optimization goal causing the life of any non-recyclable battery cells to be longer than the life of any recyclable battery cells; and displaying, at a graphical user interface, a warning message when at least one of the plurality of heterogeneous battery cells is within a specified range of the end of its operating life.

* * * * *